United States Patent [19]
Feuerherm

[11] Patent Number: 6,024,557
[45] Date of Patent: Feb. 15, 2000

[54] EXTRUSION HEAD FOR BLOW-MOLDING APPARATUS

[76] Inventor: Harald Feuerherm, Im Laach 33, D-53840, Troisdorf, Germany

[21] Appl. No.: 09/096,163

[22] Filed: Jun. 11, 1998

[30] Foreign Application Priority Data

Jun. 12, 1997 [DE] Germany .............................. 197 24 692
Mar. 16, 1998 [EP] European Pat. Off. .............. 98104727

[51] Int. Cl.[7] ............................ B29C 47/22; B29C 49/04
[52] U.S. Cl. .......................... 425/532; 264/541; 425/381; 425/465; 425/466
[58] Field of Search .................... 425/532, 465, 425/466, 381; 264/541

[56] References Cited

U.S. PATENT DOCUMENTS

| | | | |
|---|---|---|---|
| 4,124,351 | 11/1978 | Garbuio .................................. | 425/532 |
| 4,382,766 | 5/1983 | Feuerherm .............................. | 425/466 |
| 5,057,267 | 10/1991 | Seizert et al. ........................... | 425/532 |
| 5,108,682 | 4/1992 | Tompkins et al. ...................... | 425/465 |
| 5,785,920 | 7/1998 | Ogawa et al. .......................... | 425/532 |

FOREIGN PATENT DOCUMENTS

| | | | |
|---|---|---|---|
| 195 37 132 | 4/1997 | Germany . | |
| 196 03 231 | 4/1997 | Germany . | |
| 61-61809 | 3/1986 | Japan ..................................... | 425/532 |
| 5-138715 | 6/1993 | Japan ..................................... | 425/466 |
| 1199649 | 12/1985 | U.S.S.R. ................................ | 425/466 |
| 2089278 | 6/1982 | United Kingdom ................... | 425/466 |

OTHER PUBLICATIONS

"Beeinflussing Der Wanddicke Bei Der Hohlkorperfertigung", Volker Voelz, Plastverarbeiter 32, Jahrgang 1981, No. 3.

*Primary Examiner*—Robert Davis
*Attorney, Agent, or Firm*—Herbert Dubno

[57] ABSTRACT

An extrusion head for a blow-molding apparatus has an annular and relatively rigid outer housing centered on a housing axis, a rigid ring axially fixed in the housing and shiftable radially of the housing axis in the housing, and a sleeve generally coaxially received in the housing and having an upstream end secured to the ring and a downstream end radially elastically deflectable transversely of the housing axis relative to the upstream end. A rigid core coaxially received within the sleeve in the housing has an outer surface defining an annular passage with an inner surface of the sleeve. A passage-adjuster includes at least one main actuator braced between the ring and the sleeve downstream end for deforming the sleeve downstream end radially of the housing axis relative to the ring and at least one secondary actuator braced between the ring and the housing for shifting the ring and sleeve radially of the housing axis relative to the housing so that radial dimensions of angularly offset portions of the passage can be locally controlled by combined action of the actuators.

17 Claims, 11 Drawing Sheets

EXTRUSION HEAD FOR BLOW-MOLDING APPARATUS

FIELD OF THE INVENTION

The present invention relates to a blow-molding apparatus. More particularly this invention concerns an extrusion head for the type of blow-molding apparatus used to produce large workpieces like plastic motor-vehicle fuel tanks.

BACKGROUND OF THE INVENTION

A standard extrusion head for a blow-molding apparatus has an annular and relatively rigid outer housing centered on a normally vertical axis, a sleeve coaxially received in the housing and having an upstream end secured to the housing and a radially elastically deflectable downstream end, and a rigid core coaxially received within the sleeve in the housing and having an outer surface defining with an inner surface of the sleeve an annular passage. Actuators mounted on the housing are braced radially against the downstream sleeve end so as to be able to move and/or deform it radially. Furthermore the core is typically displaceable axially so as to change the average radial width of the passage since the outer surface of the core and the inner surface of the sleeve both flare axially downward at the downstream end.

When blow molding an irregularly shaped object, as for instance the above-mentioned motor-vehicle fuel tank, some parts of the tubular parison or tube exiting the downstream end of the passage are going to be subjected to substantially more stretching in the mold into which the parison is extruded than other parts. For instance if the filler mouth for the tank, which is typically formed directly by the parison, is closer to the back wall of the tank than to the front wall, the parison will be stretched more to make the front wall than to make the back wall.

Since the goal is to have a finished workpiece of uniform wall thickness, it is therefore necessary to make the parison thicker in those regions subjected to a great deal of stretching and thinner where it will not be stretched so much. This can be accomplished by computer-controlled operation of the actuator that controls the axial position of the core and the actuators that radially deform and/or displace the downstream end of the passage-defining sleeve.

In a standard system (*Plastverarbeiter* 32, 1981, no 3, pages 326–330) there are two double-acting actuators aligned along a diametral main axis and bearing on the sleeve. Both actuators can exert a radial outward tension or a radial inward compression to form the sleeve into an ellipse, or they can both exert a radial force in the same diametral direction to shift the sleeve, while maintaining it circular, to one side or the other. While such an arrangement is fairly effective, those portions of the passage offset by 45° to the main axis are not under control and it is virtually impossible to locally increase or decrease passage width in these regions.

In German 196 03 231 an extrusion head of this type is known which has connected to the core an elastically deformable sleeve that is radially deformably by four crossing spreader elements. The core actuates these spreader elements synchronously so that the passage can only be changed in a symmetrical manner. Once again there are regions left that cannot be controlled as to width.

Finally, in German 195 37 132 the nozzle housing itself is radially shiftable. Two angularly offset adjustment rings are responsible for the radial movement. This device is used to blow-mold tubing elbows where only the limited amount of adjustability provided is sufficient to locally thicken the parison where it forms the outside of the corner of the finished part.

OBJECTS OF THE INVENTION

It is therefore an object of the present invention to provide an improved extrusion head for a blow-molding apparatus.

Another object is the provision of such an improved extrusion head for a blow-molding apparatus which overcomes the above-given disadvantages, that is which allows the radial width of the passage to be controlled at virtually any portion of the passage.

SUMMARY OF THE INVENTION

An extrusion head for a blow-molding apparatus has according to the invention an annular and relatively rigid outer housing centered on a housing axis, a rigid ring axially fixed in the housing and shiftable radially of the housing axis in the housing, and a sleeve generally coaxially received in the housing and having an upstream end secured to the ring and a downstream end radially elastically deflectable transversely of the housing axis relative to the upstream end. A rigid core coaxially received within the sleeve in the housing has an outer surface defining an annular passage with an inner surface of the sleeve. A passage adjuster includes at least one main actuator braced between the ring and the sleeve downstream end for deforming the sleeve downstream end radially of the housing axis relative to the ring and at least one secondary actuator braced between the ring and the housing for shifting the ring and sleeve radially of the housing axis relative to the housing so that radial dimensions of angularly offset portions of the passage can be locally controlled by combined action of the actuators.

With this system, therefore, it is possible to control the thickness of virtually any portion of the passage independently of any other portion. Shifting the entire downstream end with concomitant deformation of the downstream end provides virtually unlimited opportunities to control the thickness of any portion of the passage.

In accordance with the invention the main actuator is effective along a main axis extending diametrally of the housing axis and the secondary actuator is effective along a secondary axis forming an angle of at most about 90° to the main axis. in addition the housing and ring are formed with radially interengaging formations permitting the ring to move radially but not axially of the housing axis in the housing.

To even broaden the flexibility of the system, the secondary actuator and the ring are provided with formations for orienting the secondary axis at any of a plurality of different acute angles to the main axis. In this arrangement the ring is at least limitedly rotatable about the housing axis in the housing and the formations include a plurality of seats angularly offset relative to the housing axis and formed in the ring. The secondary actuator is fixed in the housing and having an engagement element fittable with each of the seats. To make the necessary change, the engagement element, normally a piston rod or pin, is pulled out of the seat, normally a recess, the ring is turned, and the pin is inserted into another of the seats.

The ring according to the invention has an annular shoulder surface directed axially upstream and the sleeve has a downstream edge bearing axially downstream on and slidable on the shoulder. It is also possible for the housing to be formed with an annular groove opening radially inward toward the housing axis and having a pair of axially spaced end walls. The ring and sleeve both are guided in this groove and slidable on the end walls thereof.

The blow-molding extrusion head wherein the ring can be discontinuous and C-shaped. In addition the main actuator includes a pair of diametrally opposed and independently operable double-acting actuators each having an engagement element bearing radially of the housing axis on the sleeve. Each main actuator is pivotal about an axis parallel to the housing axis on the ring and the secondary actuator is pivoted about an axis parallel to the housing axis on the housing and about another axis parallel to the housing axis on the ring. Thus when the sleeve moves, no lateral force is applied to any of the actuators so that they do not jam.

The sleeve upstream end is thick and substantially nondeformable and the sleeve downstream end is thin and elastically deformable. Furthermore the core includes an annular and elastically deformable skirt forming the core outer surface and a head displaceable relative to the skirt and carrying a plurality of angularly spaced abutments radially outwardly engageable with the skirt. The abutments may be independently and remotely operated. The center element is axially movable in the skirt. In addition the core can further include a pair of concentric shafts one of which carries the center element and a second head attached to the other of the shafts and movable axially independently of the first-mentioned head into and out of contact with the skirt. By independent axial and/or rotary motion of these two heads it is possible to deform the skirt in any desired manner. This greatly increases the possible variations of the width of the passage at any location.

In another extrusion head for a blow-molding apparatus according to the invention there is no ring. Instead the two actuators or two sets of actuators are braced between the housing and the sleeve, effective along respective axes extending at an angle of at most about 90° to the main axis for deforming the sleeve downstream end radially of the housing axis relative to the housing so that radial dimensions of angularly offset portions of the passage can be locally controlled by combined action of the actuators. Normally the main and secondary axes are offset by about 90°. Once again, to compensate for shifting of the sleeve one of the actuators is connected via a pivot with the sleeve. In a particular embodiment each of the actuators includes a pair of diametrally opposite double-acting actuators braced against diametrally opposite sides of the sleeve.

Another extrusion head in accordance with the invention is provided with at least two abutments fixed in the housing and radially engageable with the sleeve at locations angularly offset from the main actuator on radial outward deformation of the sleeve at the locations. Thus when the sleeve is deformed outward, it contacts these abutments which control the passage shape and insure that it will not go beyond a certain minimum. The abutments are radially displaceable and fixable in the housing.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
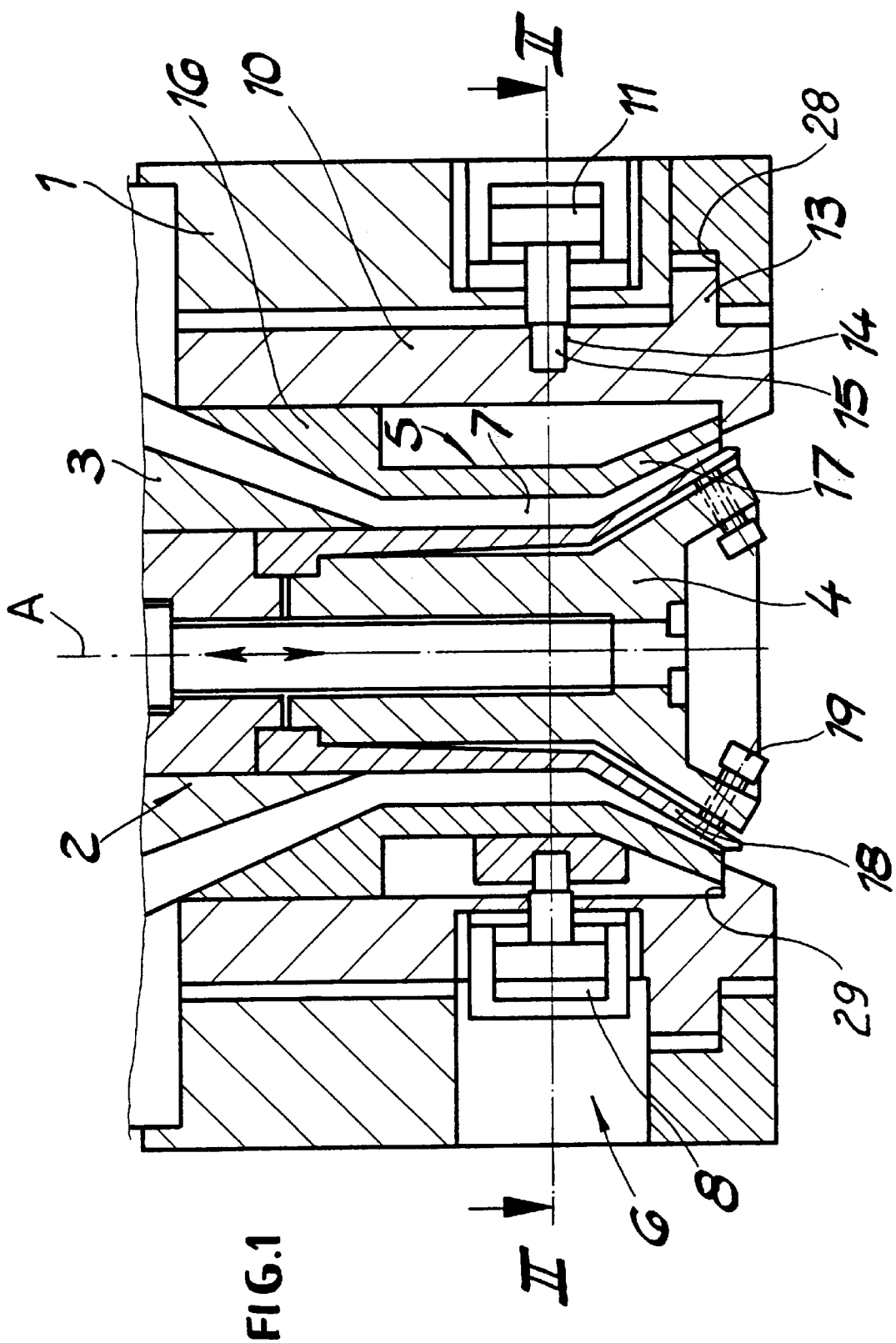
FIG. 1 is an axial section through an extruder head according to the invention, the section plane of FIG. 1 being shown at I—I in FIG. 2.
Figure 2:
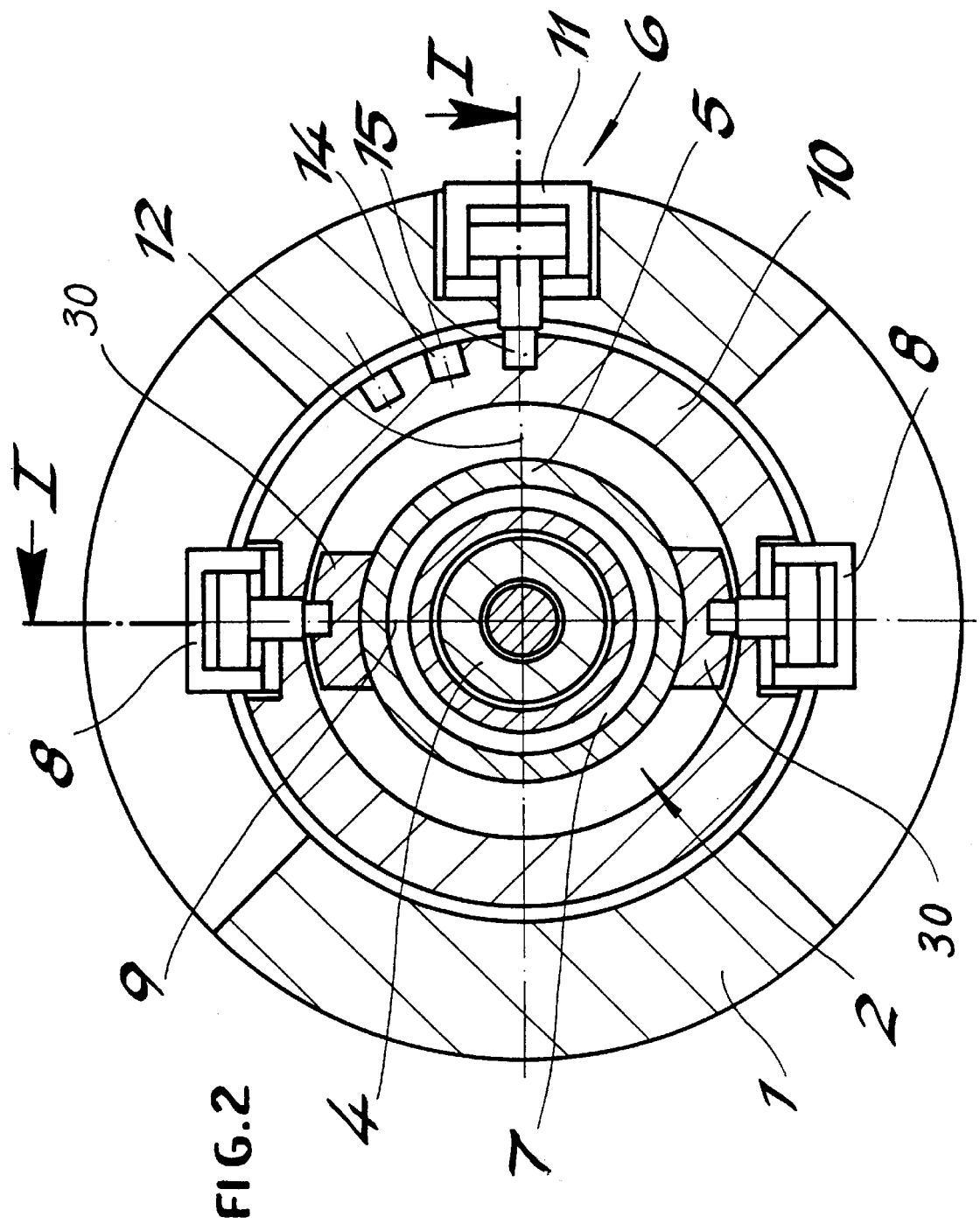
FIG. 2 is a cross section taken along line II—II of FIG. 1.

As seen in FIGS. 1 and 2 a blow-molding head basically comprises a rigid annular housing 1 centered on a normally upright axis A and supplied from the top with molten plastic by an unillustrated extruder. Centered on the axis A is a core 2 comprised of an upstream core part 3 radially and axially fixed on the housing 1 and a downstream center core pin 4 that is axially movable in the part 3. Surrounding the core 2 is a sleeve 5 having an inner surface defining an annular downwardly open passage 7 with an outer surface of the core 2. A rigid control and support ring 10 coaxially surrounds the sleeve 5 in the housing 1 and is formed with a radially outwardly projecting ridge 13 bearing on an upstream-facing planar shoulder 28 of the housing 1 so that this ring 10 can move perpendicular to the passage axis A but cannot move axially. The sleeve 5 has a flexible downstream end 17 that bears axially on another shoulder 29 formed on this ring 10 and a stiff upstream end 16 fixed on the ring 10. Thus the sleeve 5 is axially fixed to the ring 10 and can move as a whole transversely of the axis A with the ring 10 but the sleeve downstream end 17 can itself move transversely of the axis A relative to the ring 10.

The sleeve 5 can be displaced and deformed transversely of the axis A by a control system 6 comprising two double-acting actuators 8 aligned along a diametral main axis 9 and each having an outer part formed as a cylinder seated in the ring 10 and an inner part bearing via a welded-on shoe 30 on the flexible lower end 17 of the sleeve 5. The system 6 further comprises another actuator 11 effective along an axis 12 here shown perpendicular to the axis 9 and having a cylinder part seated in the housing 1 and a piston rod 15 seated in the ring 10. In fact the ring 15 1 is seated in one of several angularly offset and radially outwardly open holes 14 formed in the ring 10 and the housing 1 is cut out at 31 surrounding each actuator 8 so that the angular offset between the axes 9 and 12 can be changed by use of the different holes 14. Either of the actuators 8 or 11 could be replaced with a standard linear-acting servoactuator with a built in travel or path detector that reports back to an unillustrated computerized control system the actual position of the respective actuator.

It is important to note that what the actuators 8 do is move the sleeve lower end 17 relative to the ring 10. On the other hand the actuator 11 displaces the ring 10 with the entire sleeve 5 relative to the housing 1. The combined actions of the actuators 8 and 11 can thus produce the various passage shapes shown in FIGS. 10a through 10j. Clearly, it is possible to create virtually any radial dimension of the passage 7 at virtually any location on it.

The core 2 also comprises a somewhat flexible skirt 18 defining the inner wall of the gap 7 and having an upstream end fixed to the stationary core part 3 and a lower or downstream end coaxially juxtaposed with an inner part of the sleeve 5 and braced thereagainst by a plurality of angularly equispaced adjusters here formed as screws 19 threaded through the core pin 4 and bearing radially outward on the skirt 18. The positions of the screws 19 determines a base position for the skirt 18. Of course the manually actuated screws 19 could be replaced by remotely actuatable devices like the actuators 8 and 11.

Figure 3:
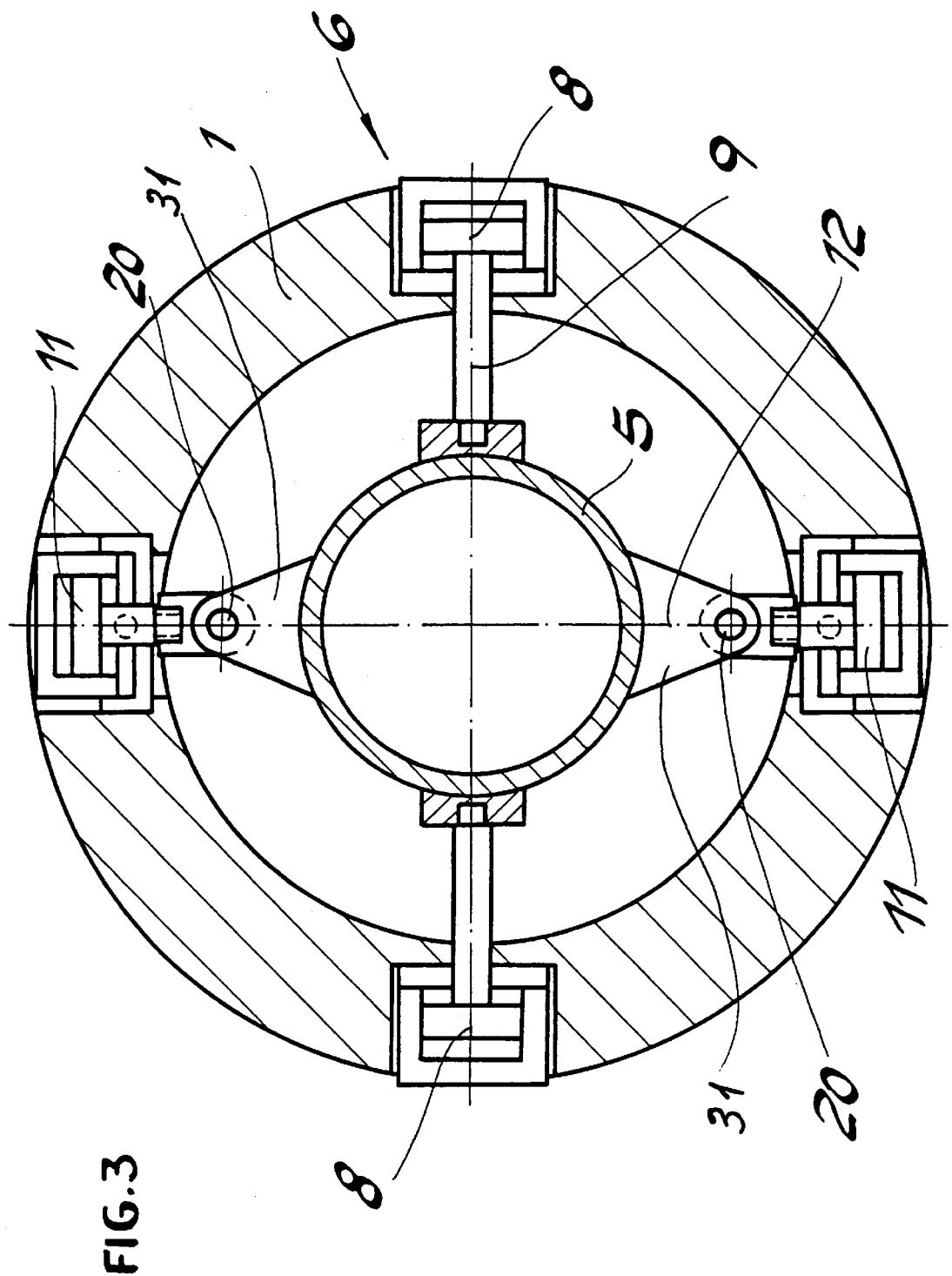
FIGS. 3, 4, and 5 are cross sections like FIG. 2 of variations on the head of the invention.

In the system of FIG. 3 there are two diametrically opposed such actuators 11 connected via pivots 20 to tabs 31 fixed on the sleeve 5, and the actuators 8 are mounted in the housing 1, like the actuators 11. The pivots 20 compensate for a shifting along axis 9 of the sleeve 5.

Figure 4:
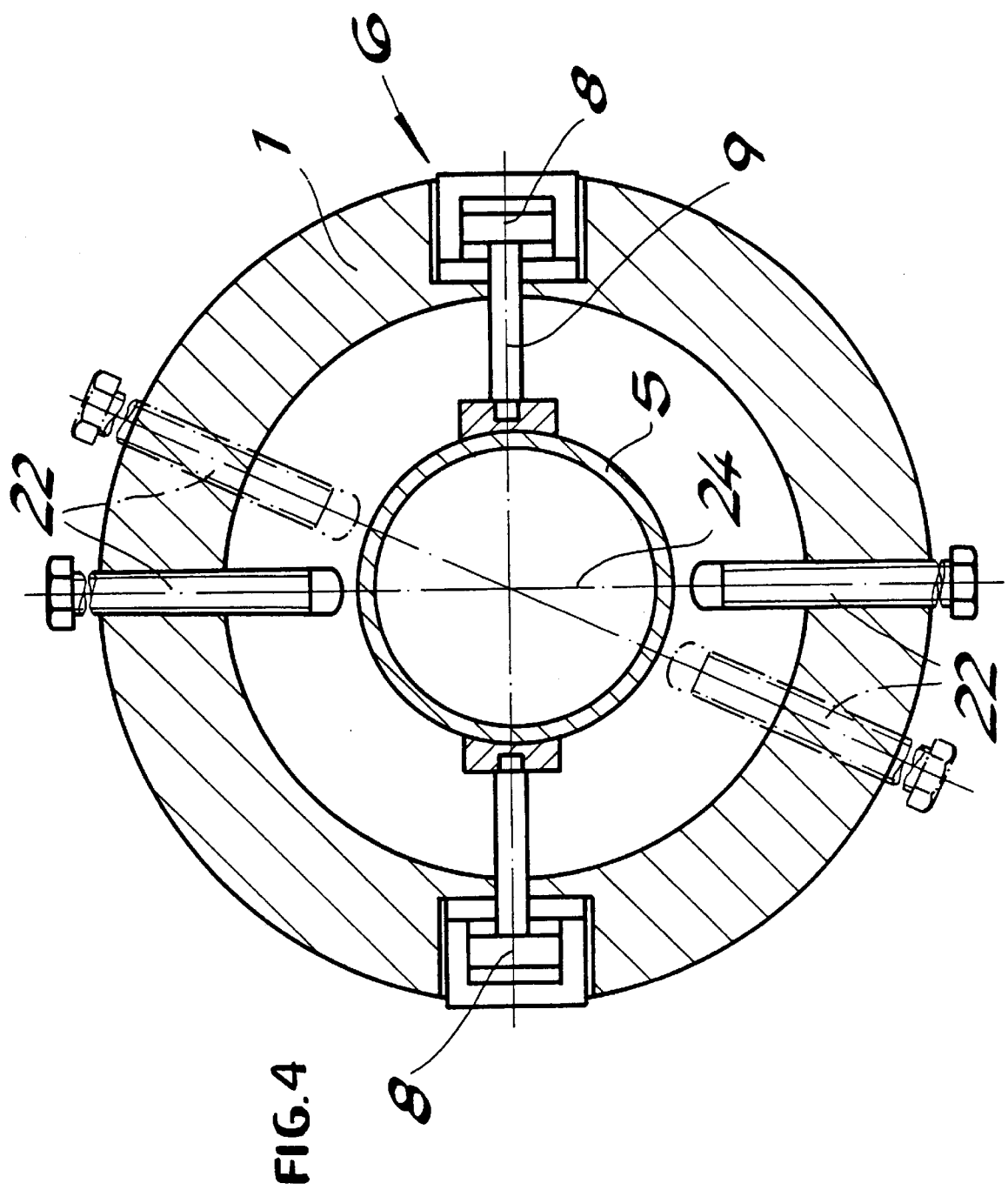

FIG. 4 shows an arrangement where abutments 22, here formed as radially extending screws seated in the housing 1, are provided whose inner ends engage the sleeve 5 when same is deformed outward beyond a predetermined limit. These abutment screws 22 are aligned along an axis 24 which may correspond to the axis 12 or be offset thereto as shown in dot-dash lines. They serve to define an outer limit position for the sleeve 5, for instance to prevent complete closing of the passage 7 at the respective locations.

Figure 5:
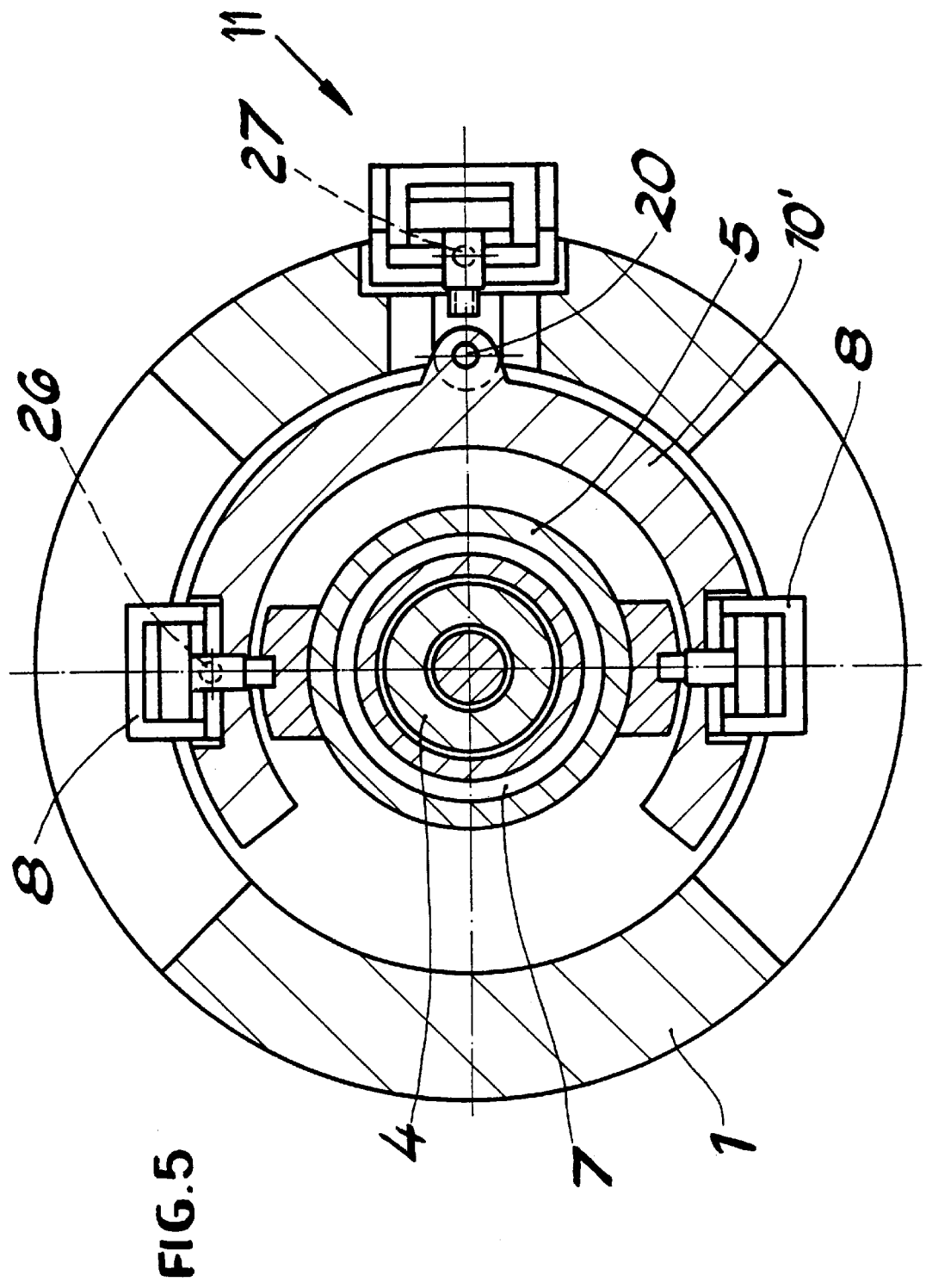

In FIG. 5 a C-shaped ring 10' is centrally connected at a pivot 20 with the actuator 11 which itself is pivotal about an axis 27 parallel to the axis A. Similarly the actuators 8 are pivoted at 26 on the ring 10 so that they can follow the movements of the sleeve 5.

Figure 6:
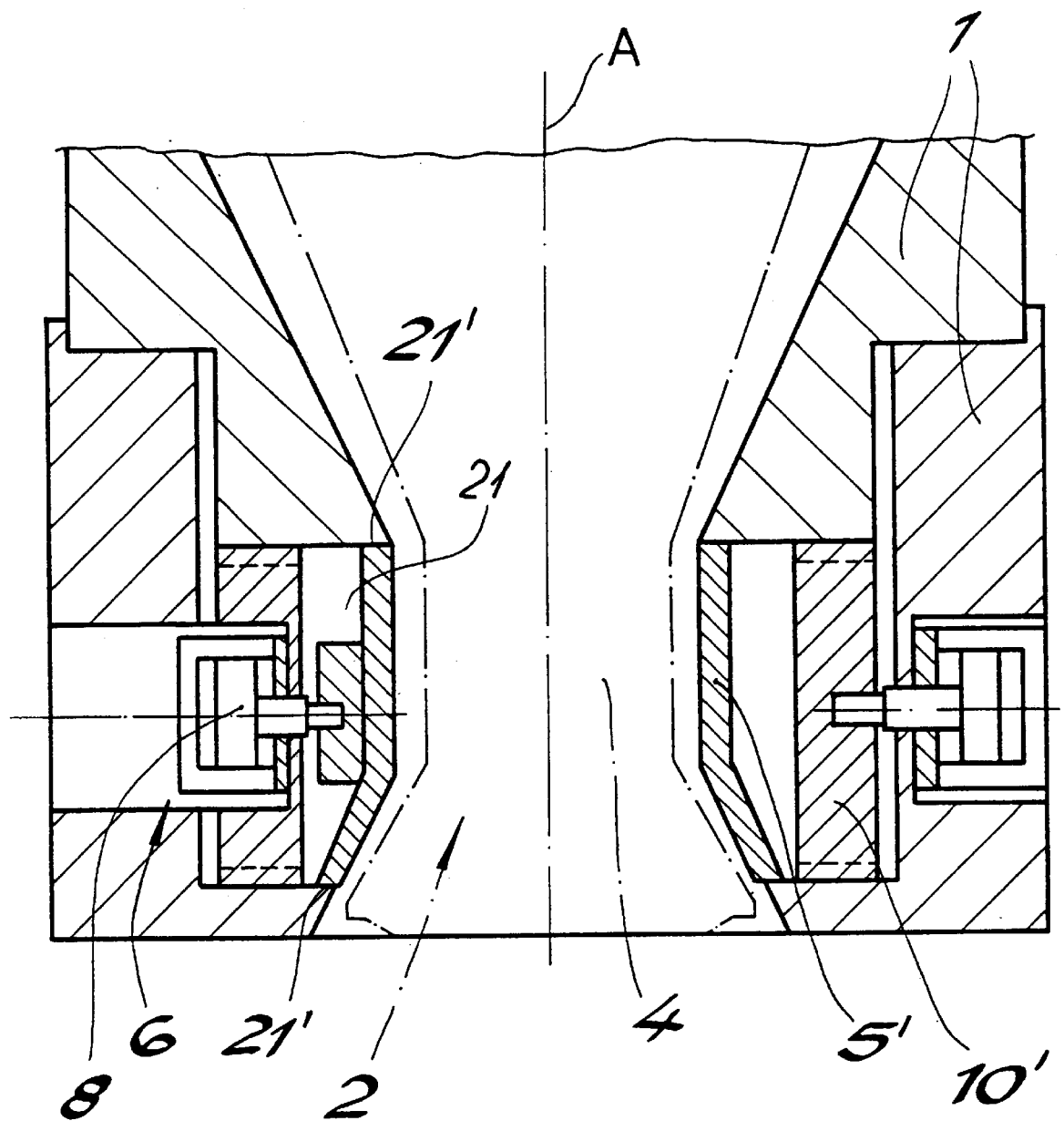
FIGS. 6, 7, and 8 are axial sections like FIG. 1 but showing further variations on the head of this invention.

The housing 1 in FIG. 6 is formed with a radially inwardly open slot 21 having a pair of planar flanks 21' extending perpendicular to the axis A. The ring 10' and sleeve 5' ride on these surfaces or flanks 21' so as to be directly supported and guided in the housing 1.

Figure 7:
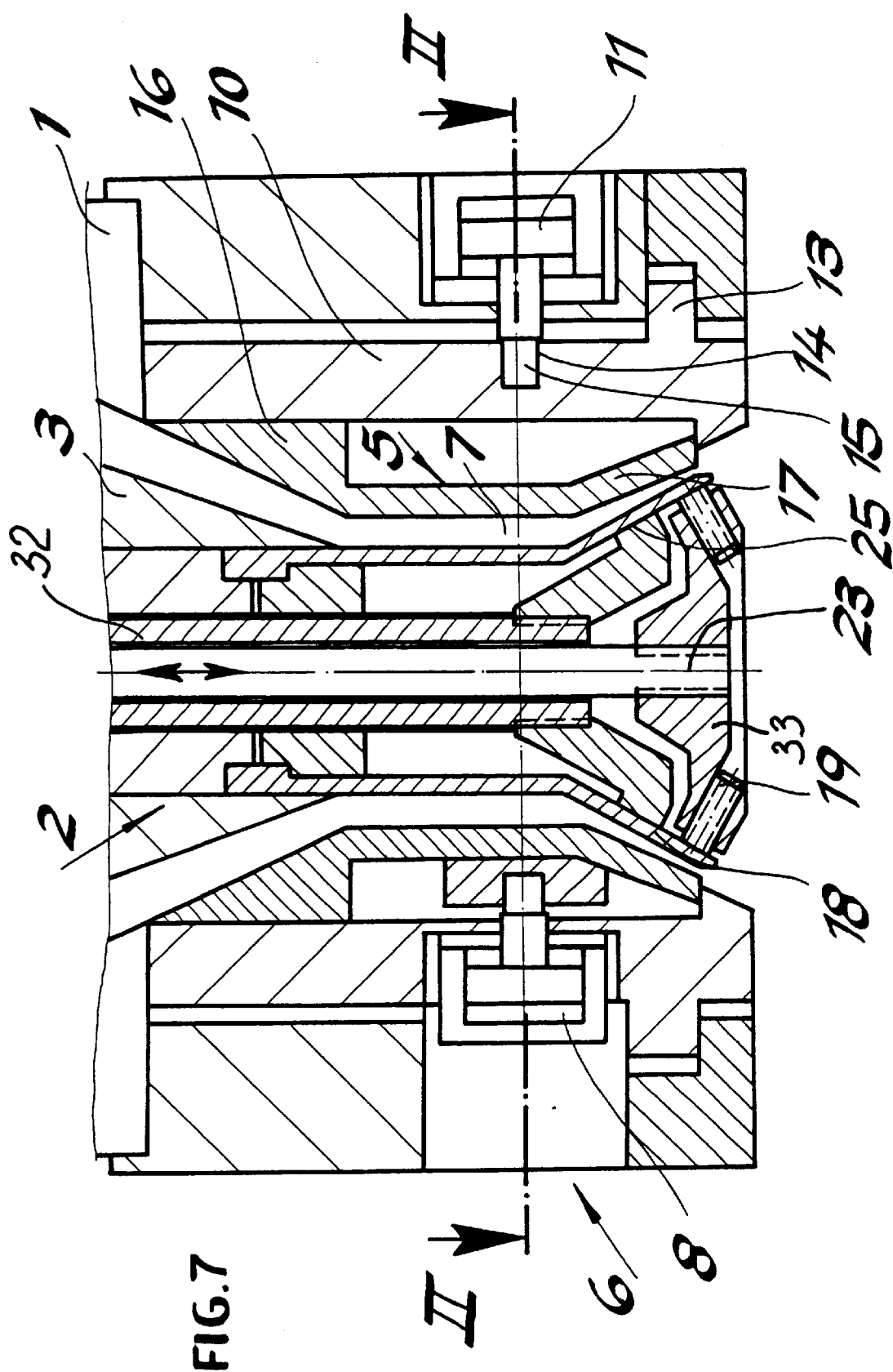

The system of FIG. 7 has a core 2' provided with an inner core shaft 23 carrying a head 33 in turn carrying the adjusters 19, and a tubular outer core shaft 32 carrying a head 25 bearing directly on the frustoconical inner surface of the downstream end of the skirt 18. These two shafts 23 and 32 can be axially displaced independently of each other to effect different deformations of the skirt 18. It is also possible to set the abutment screws 19 for a particular shape and to only pull it into contact with the skirt 18 when that shape is needed, or even to rotate the inner shaft 23 and its head 33 while in effective contact with the skirt 18 to create in the exiting workpiece a helical region of different thickness.

Figure 8:
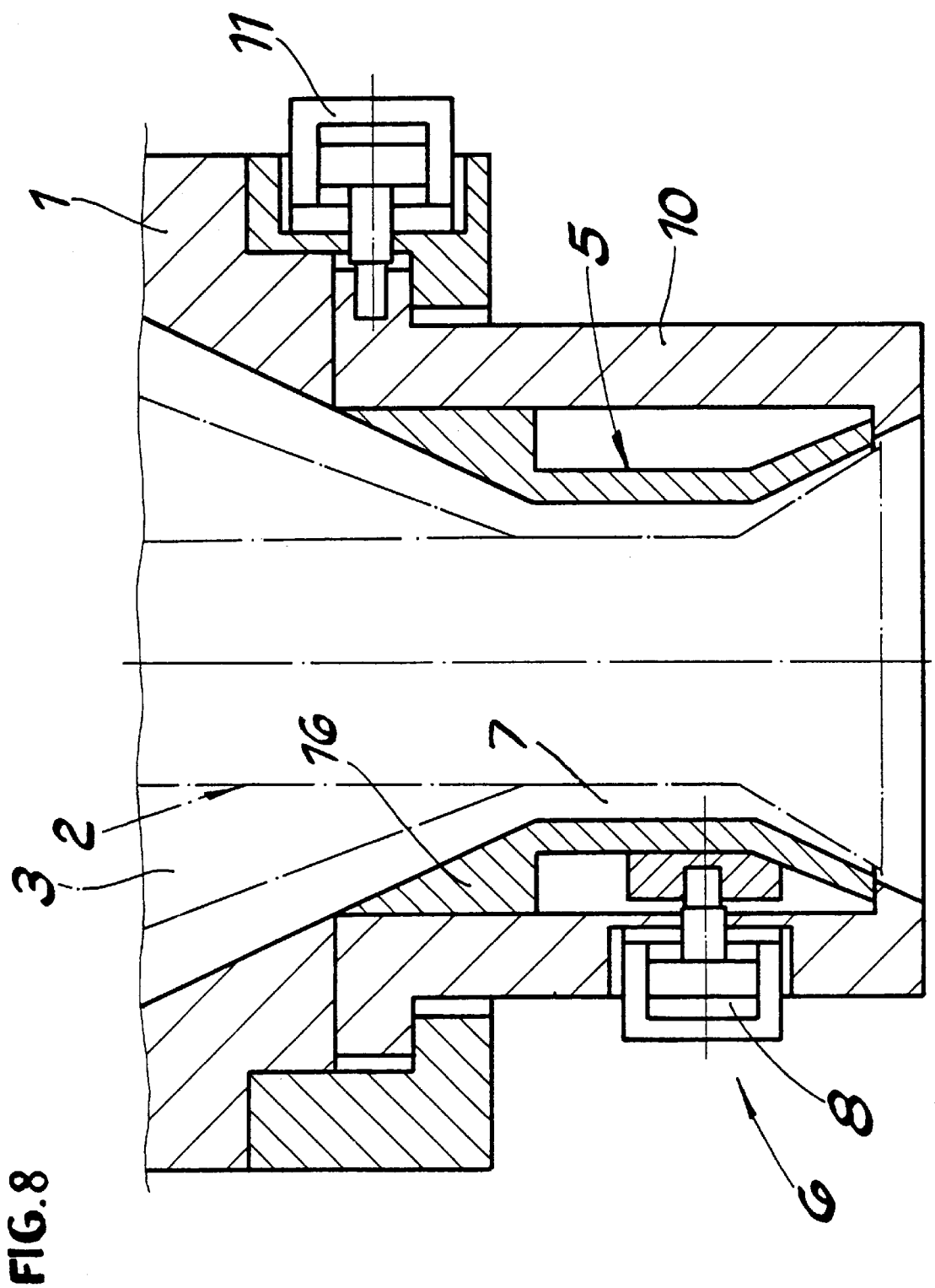

In FIG. 8 the actuator or actuators 11 are axially offset, here upstream, from the actuators 8. Since the actuator 11 moves the ring 10 carrying the upstream end 16 of the sleeve 5, this system works substantially the same as that of FIGS. 1 and 2.

Figure 9:
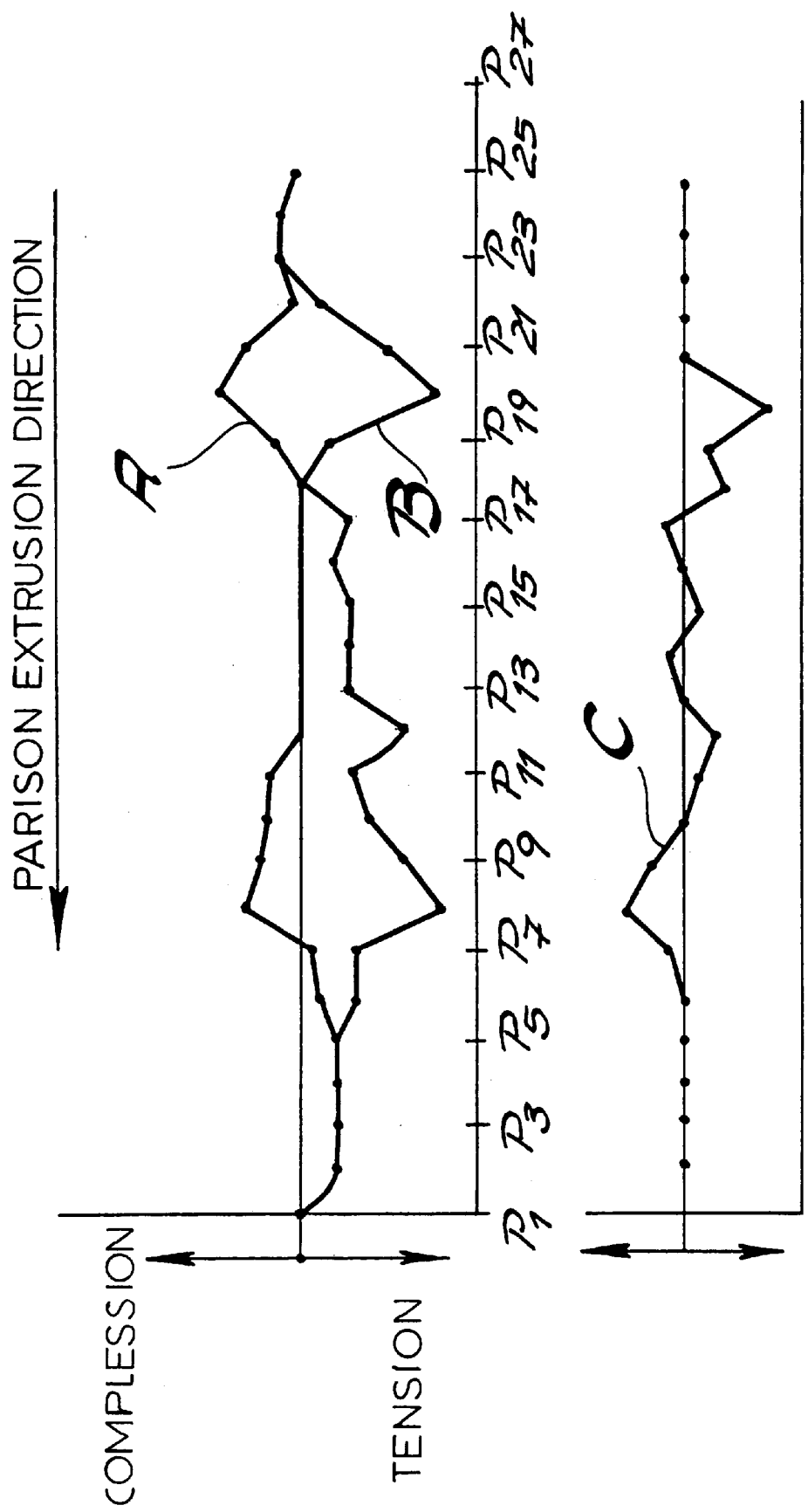
FIG. 9 is a graph showing the operation of the system of this invention.
Figure 10A:
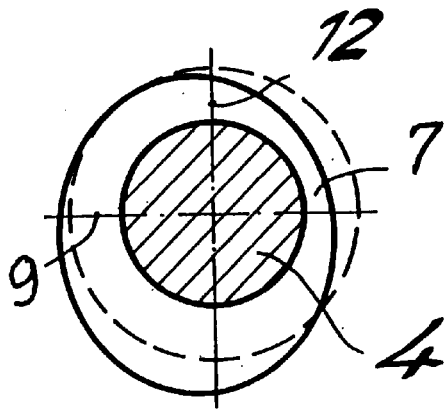
FIG. 10a through 10j are small-scale end views illustrating deformations of the extrusion passage according to the invention.
Figure 10B:
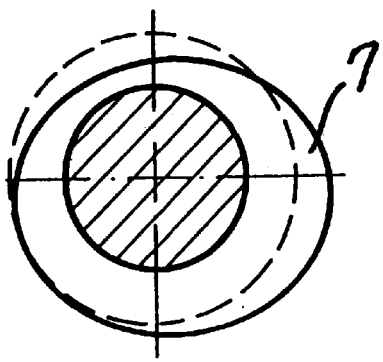
Figure 10E:
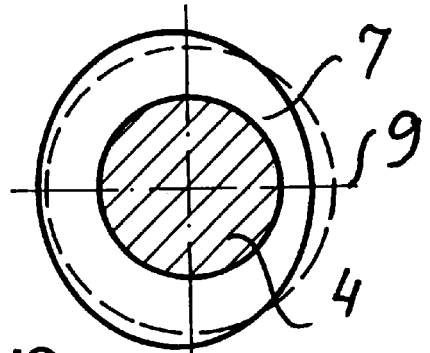
Figure 10F:
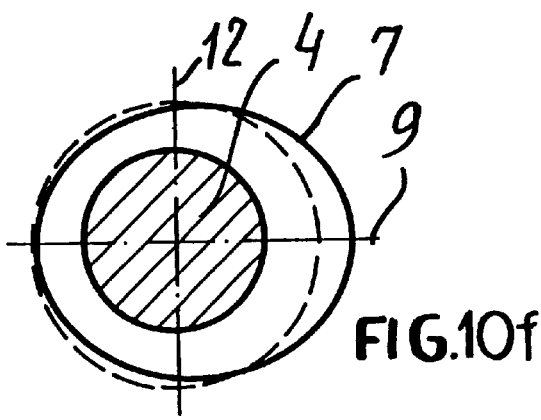
Figure 10I:
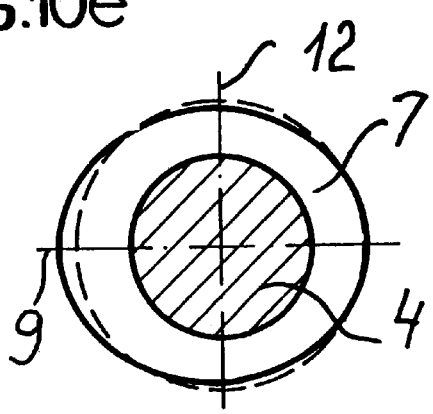
Figure 10J:
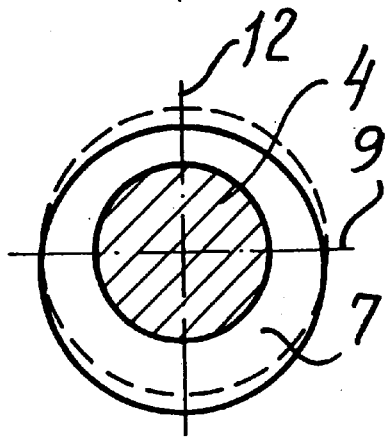
Figure 10C:
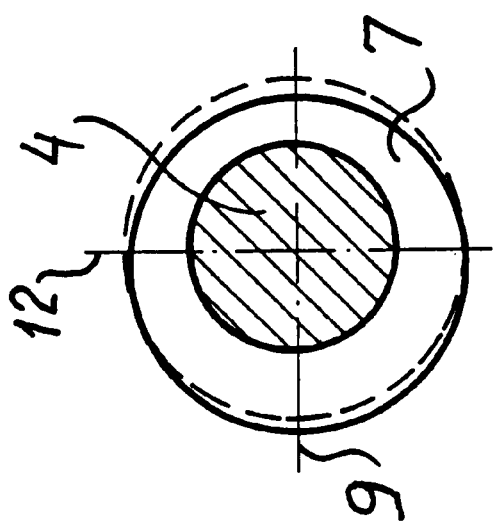
Figure 10D:
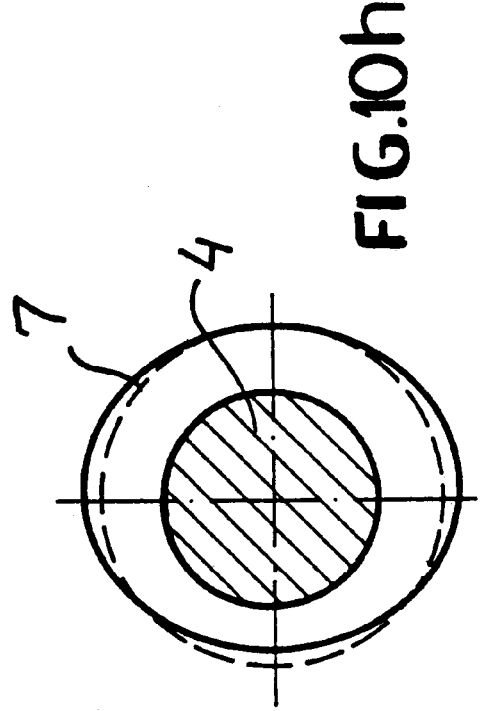
Figure 10G:
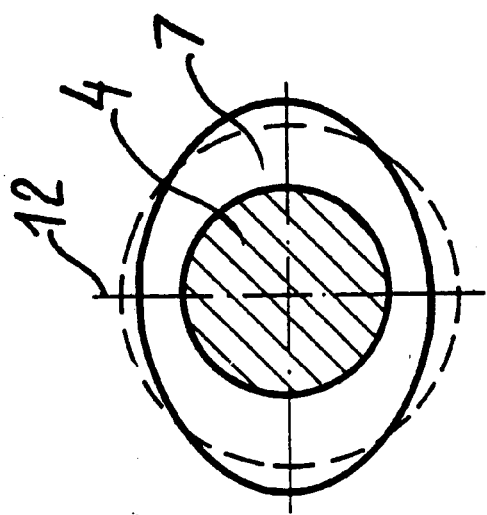
Figure 10H:
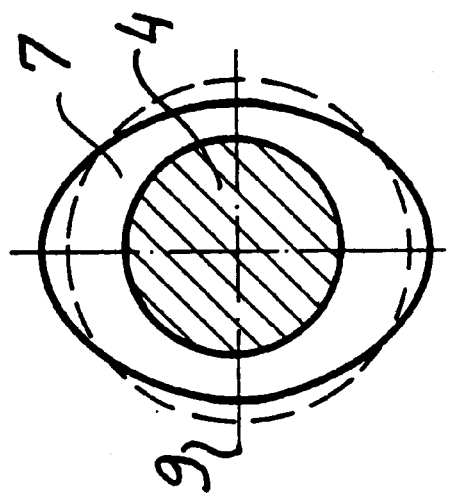

FIG. 9 shows a graph where the movements of the two diametrally opposite actuators 8 are shown at lines A and B and that of the actuator 11 at the line C. Thus the deformation causes the extruded parison to have locally different thicknesses, varying both angularly and axially so that, when the different portions of the parison are differently stretched to conform to the mold it is extruded into, the resultant workpiece will be of uniform thickness. FIG. 9 clearly shows that the movements of the various actuators 8 and 11 are independent of each other and result, for example at times P8 and P20, in a particularly elliptical shape of the sleeve 5 while at time P2–P5 the entire sleeve 5 is shifted to one side but remains circular in section.

This arrangement can serve as described above for varying the thickness of portions of the extruded parison. It can also serve in a straightforward tube extruder, where the parison is to leave the head with the most uniform possible wall thickness, to perfectly center the sleeve 5 in the housing 1. This adjustment can be effected on the fly, that is while the extruder is operating, or between operation cycles.

I claim:

1. An extrusion head for a blow-molding apparatus, the extrusion head comprising:

an annular and relatively rigid outer housing centered on a housing axis;

a rigid ring axially fixed in the housing and shiftable radially of the housing axis in the housing;

a sleeve generally coaxially received in the housing and having an upstream end secured to the ring and a downstream end radially elastically deflectable transversely of the housing axis relative to the upstream end;

a rigid core coaxially received within the sleeve in the housing and having an outer surface defining an annular passage with an inner surface of the sleeve; and passage-adjusting means including a main actuator braced between the ring and the sleeve downstream end for deforming the sleeve downstream end radially of the housing axis relative to the ring, and a secondary actuator braced between the ring and the housing for shifting the ring and sleeve radially of the housing axis relative to the housing, whereby radial dimensions of angularly offset portions of the passage can be locally controlled by combined action of the actuators.

2. The blow-molding extrusion head defined in claim 1 wherein the main actuator is effective along a main axis extending diametrally of the housing axis and the secondary actuator is effective along a secondary axis forming an angle of at most about 90° to the main axis.

3. The blow-molding extrusion head defined in claim 2 wherein the housing and ring are formed with radially interengaging formations permitting the ring to move radially but not axially of the housing axis in the housing.

4. The blow-molding extrusion head defined in claim 2 wherein the secondary actuator and the ring are provided with means including formations for orienting the secondary axis at any of a plurality of different acute angles to the main axis.

5. The blow-molding extrusion head defined in claim 4 wherein the ring is at least limitedly rotatable about the housing axis in the housing and the formations include a plurality of seats angularly offset relative to the housing axis and formed in the ring, the secondary actuator being fixed in the housing and having an engagement element fittable with each of the seats.

6. The blow-molding extrusion head defined in claim 2 wherein the ring has an annular shoulder surface directed axially upstream and the sleeve has a downstream edge bearing axially downstream on and slidable on the shoulder.

7. The blow-molding extrusion head defined in claim 2 wherein the housing is formed with an annular groove opening radially inward toward the housing axis and having a pair of axially spaced end walls, the ring and sleeve both being guided in the groove and slidable on the end walls thereof.

8. The blow-molding extrusion head defined in claim 2 wherein the ring is discontinuous and C-shaped.

9. The blow-molding extrusion head defined in claim 2 wherein the main actuator includes a pair of diametrally opposed and independently operable double-acting actuators each having an engagement element bearing radially of the housing axis on the sleeve.

10. The blow-molding extrusion head defined in claim 1 wherein the main actuator is pivotal about an axis parallel to the housing axis on the ring and the secondary actuator is pivoted about an axis parallel to the housing axis on the housing and about another axis parallel to the housing axis on the ring.

11. The blow-molding extrusion head defined in claim 2 wherein the sleeve upstream end is thick and substantially nondeformable and the sleeve downstream end is thin and elastically deformable.

12. The blow-molding extrusion head defined in claim 2 wherein the core includes an annular and elastically deformable skirt forming the core outer surface and a head displaceable relative to the skirt and carrying a plurality of angularly spaced abutments radially outwardly engageable with the skirt.

13. The blow-molding extrusion head defined in claim 12 wherein the center element is axially movable in the skirt.

14. The blow-molding extrusion head defined in claim 12 wherein the core further includes a pair of concentric shafts one of which carries the center element, and a second head attached to the other of the shafts and movable axially independently of the first-mentioned head into and out of contact with the skirt.

15. An extrusion head for a blow-molding apparatus, the extrusion head comprising:

an annular and relatively rigid outer housing centered on a housing axis;

a sleeve generally coaxially received in the housing and having an upstream end axially fixed relative to the housing and a downstream end radially elastically deflectable transversely of the housing axis relative to the upstream end;

a rigid core coaxially received within the sleeve in the housing and having an outer surface defining an annular passage with an inner surface of the sleeve; and passage-adjusting means including a main actuator braced between the housing and the sleeve downstream end and effective along a main axis extending diametrally of the housing axis for deforming the sleeve downstream end radially of the housing axis relative to the housing, and a secondary actuator braced between the housing and the sleeve and effective along a secondary axis extending at an angle of at most about 90° to the main axis for deforming the sleeve downstream end radially of the housing axis relative to the housing, whereby radial dimensions of angularly offset portions of the passage can be locally controlled by combined action of the actuators, one of the actuators being connected via a pivot with the sleeve.

16. The blow-molding extrusion head defined in claim 15 wherein the main and secondary axes are offset by about 90°.

17. The blow-molding extrusion head defined in claim 16 wherein each of the actuators includes a pair of diametrally opposite double-acting actuators braced against diametrally opposite sides of the sleeve.

\* \* \* \* \*